(12) United States Patent  
Schein

(10) Patent No.: US 10,181,130 B2  
(45) Date of Patent: Jan. 15, 2019

(54) REAL-TIME UPDATES TO DIGITAL MARKETING FORECAST MODELS

(71) Applicant: Adobe Inc., San Jose, CA (US)

(72) Inventor: Andrew I. Schein, Sunnyvale, CA (US)

(73) Assignee: Adobe Systems Inc., San Jose, CA (US)

( * ) Notice: Subject to any disclaimer, the term of this patent is extended or adjusted under 35 U.S.C. 154(b) by 439 days.

(21) Appl. No.: 13/925,138

(22) Filed: Jun. 24, 2013

(65) Prior Publication Data

US 2014/0379460 A1    Dec. 25, 2014

(51) Int. Cl.  
*G06Q 30/02* (2012.01)

(52) U.S. Cl.  
CPC ................... *G06Q 30/0244* (2013.01)

(58) Field of Classification Search  
None  
See application file for complete search history.

(56) References Cited

U.S. PATENT DOCUMENTS

| | | | |
|---|---|---|---|
| 8,374,949 B2 * | 2/2013 | Cheung | 705/37 |
| 8,380,570 B2 * | 2/2013 | Agarwal et al. | 705/14.4 |
| 8,572,011 B1 * | 10/2013 | Sculley, II | 706/13 |
| 8,788,336 B1 * | 7/2014 | Baratloo et al. | 705/14.41 |
| 2011/0173065 A1 * | 7/2011 | Lester et al. | 705/14.45 |
| 2012/0084142 A1 * | 4/2012 | Li et al. | 705/14.46 |
| 2012/0158456 A1 * | 6/2012 | Wang et al. | 705/7.31 |
| 2013/0304572 A1 * | 11/2013 | Axe et al. | 705/14.49 |

OTHER PUBLICATIONS

Method and system for displaying relevant advertisements to users based on referrer URLs, Kumar/Mohamed, Publication:Aug. 13, 2010.*

* cited by examiner

*Primary Examiner* — Fonya M Long  
*Assistant Examiner* — Alexanru Cirnu  
(74) *Attorney, Agent, or Firm* — Finch & Maloney PLLC

(57) ABSTRACT

Techniques are disclosed for automatically creating or updating predictive models, including digital marketing forecast models. A predictive model is updated in real-time or near real-time using a stochastic gradient descent optimization method based on one or more predictive values associated with an advertising impression that is won in an online advertising auction. Each predictive value, which is obtained from the predictive model, is encoded as an argument in a uniform resource locator (URL) corresponding to the ad impression being auctioned. If and when the ad impression is won, the predictive value(s) and other information can be tracked and immediately available for updating the model using information encoded in the URL.

15 Claims, 3 Drawing Sheets

REAL-TIME UPDATES TO DIGITAL MARKETING FORECAST MODELS

FIELD OF THE DISCLOSURE

This disclosure relates to marketing, and more particularly, to systems and methods for automatically creating and/or updating, in real-time or near real-time, aspects of one or more models for forecasting costs and other information associated with digital marketing activities.

BACKGROUND

Many businesses incur significant expenditures for marketing activities in anticipation that such activities will increase revenue and promote growth of the business. Some of these expenditures can be associated with various forms of advertising media, such as television, radio, print (e.g., newspaper, magazine, catalog, direct mail, etc.), outdoor (e.g., billboard), in-store promotions, telephone solicitation, electronic mail, web-based ads, and so forth. The observed performance of certain marketing activities, such as cost per advertising impression, revenue per impression, and so forth, can be used to aid decisions regarding future expenditures. Accordingly, models can be developed for forecasting the financial future of various marketing activities based on historical data. In the context of online advertising, a so-called ad impression generally refers to an event where an online ad is displayed, regardless of whether it is clicked on or not. Thus, each time a given ad is displayed counts as one impression. Counting such ad impressions is a common approach by which most online advertising is assigned value (e.g., in currency), wherein the ad cost is quoted in cost per impression (CPI) or cost per 1,000 impressions (CPM).

DETAILED DESCRIPTION

Figure 1:
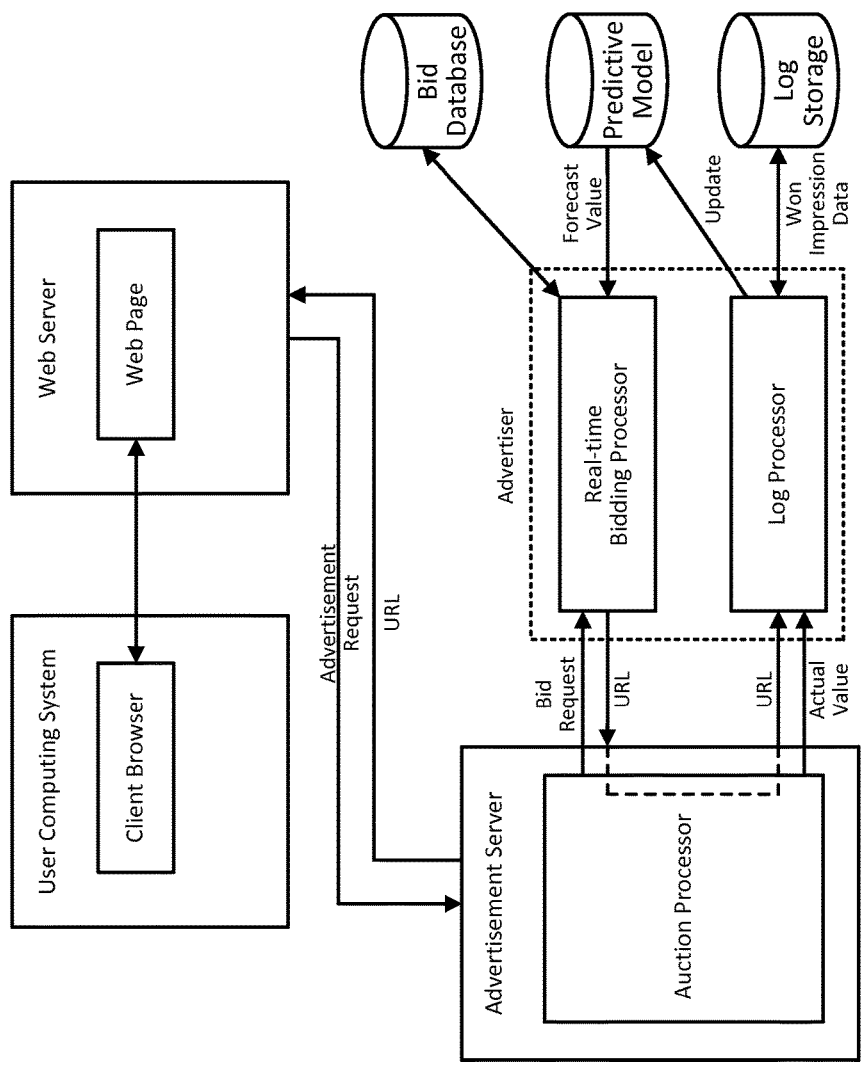
FIG. 1 illustrates an example digital marketing forecasting system configured in accordance with an embodiment of the present invention.

Various embodiments are directed to techniques for automatically creating or updating predictive models, including digital marketing forecast models. In some embodiments, a predictive model can be updated in real-time or near real-time using a stochastic gradient descent optimization method based on one or more predictive values associated with an advertising impression that is won in an online advertising auction. Each predictive value, which is obtained from the predictive model, is encoded as an argument in a uniform resource locator (URL) corresponding to the ad impression being auctioned. If and when the ad impression is won, the predictive value(s) and other information can be tracked and immediately available for updating the model using information encoded in the URL. Numerous configurations and variations will be apparent in light of this disclosure.

General Overview

As previously mentioned, predictive models can be developed for forecasting the financial future of various marketing activities, including digital (also referred to as online) advertising. Such forecasts may then be used, for instance, as the basis of a bidding strategy where the marketing activities involve participation in online advertising auctions, where advertisers compete for space on a given web page over various time periods and ads are displayed in differentiated locations on that web page based on advertiser bids. So, for example, if there is only one location on a given web page for an online ad (such as a banner ad) and two competitors are seeking to place their respective advertisement in that location at a given moment in time (e.g., upon loading of that web page into the browser associated with a particular user that is known to be a potential customer for both of the competitors), then the competitor with the higher bid will likely win the auction and that competitor's ad will be displayed to the user (assuming the highest bid is a determining factor). In this way, a digital marketing environment can be fast-paced, with very large numbers of ad impressions being served each day (perhaps many millions), and a correspondingly large amount of observational data being collected and stored in, for example, a data warehouse. For instance, data can be obtained and evaluated for many different combinations of products, advertising channels, promotions, time periods and/or geographic locations. Thus, to achieve accurate forecasts, it is desirable to update the predictive models in real-time or near real-time as new data is observed. However, accessing large amounts of information stored in a data warehouse, particularly raw data, can be impractical for performing real-time or near real-time computations due to various resource constraints, such as data availability and computational overhead. With some conventional techniques, forecast models are therefore updated using more easily accessible historical data that significantly lag in time behind current activities. Consequently, the predictions produced by such models derived from historical or otherwise outdated data may include undesirable errors that can adversely affect decisions regarding future marketing expenditures.

Thus, and in accordance with at least one embodiment of the present invention, the forecast cost per impression, forecast revenue per impression, and/or any other predicted value obtained from a predictive model is encoded as an argument in a uniform resource locator (URL) associated with an ad impression that is won in an online advertising auction. In this manner, the predictive or so-called forecast value(s) can be tracked and immediately available using information encoded in the URL. Since, for example, actual cost information associated with the winning impression (that ad that was displayed) is provided by the advertising exchange, the error associated with the forecast cost can then be calculated and used to perform a stochastic gradient descent update to the predictive model. As will be appreciated in light of this disclosure, the techniques variously described herein can be applied to a wide variety of predictive model algorithms including linear regression, logistic regression, non-linear artificial neural networks, and the perceptron classification algorithm.

In accordance with an example embodiment, the cost (or other predicted parameter, such as revenue) associated with an ad impression can be predicted as follows. When a request to bid in an online advertising auction arrives at a real-time bidding (RTB) processor, a forecast cost is computed using a predictive model. The forecast cost may represent, for example, the predicted cost associated with serving the ad impression to a user for a given product, advertising channel, promotion, time, geographic location and/or other dimension of the predictive model. The RTB processor then encodes the forecast cost value, in addition to a bid for the auction, as an argument in a URL, which is configured to direct a browser to the online advertisement. The URL, including the bid, is submitted to the online auction. If and when the bid is won in the auction, the ad is served to a user via the URL and the forecast cost value is returned to a log processor as an argument encoded in the URL. The log processor may further receive, from the advertising server or other source, the actual cost per impression. Using the forecast cost and the actual cost values, the prediction error can be computed as follows: prediction error=(forecast cost value−actual cost value). In this manner, the error can be promptly calculated by the log processor using the forecast cost value provided in the URL. This technique is in contrast to, for example, one in which the forecast cost value (and possibly other data) are retrieved from a separate database, such as from a data warehouse containing potentially stale data. From the error, the predictive model can be updated using a stochastic gradient descent optimization technique.

System Architecture

FIG. 1 illustrates an example digital marketing environment configured in accordance with an embodiment of the present invention. In this example, a user computing system includes a client browser (e.g., Microsoft Internet Explorer®, Mozilla Firefox®, Safari®, Google Chrome®, and Opera®) configured to interact electronically with a web page hosted by a web server. An advertisement server includes an auction processor configured to perform auctions in which various online content providers announce to advertisers that they have an opportunity to present an advertisement to users. The advertisement server is configured to interact electronically with the computing system of an advertiser (generally designated as advertiser), which may include a real-time bidding (RTB) processor and/or a log processor. As can be seen, the advertiser is configured to electronically access various data storage systems, including, for example, bid, predictive model and log storage databases. The data storage can be implemented, for example, with any suitable type of memory, such as a disk drive included in, or otherwise in communication with, the RTB processor and/or log processor. Other suitable memories include flash memory, random access memory (RAM), a memory stick or thumb drive, USB drive, cloud storage service, etc. In a more general sense, any memory facility can be used to implement the data storage.

It will be appreciated that, in some embodiments, various functions performed by the RTB processor and the log processor, and the bid, predictive model and log storage databases, as described herein, can performed by similar processors and/or databases in different configurations and arrangements, and that the depicted embodiments are not intended to be limiting. Various components of this example embodiment can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

In operation, the web page can be configured to display an ad provided by a third-party advertiser. The selection of the ad can be achieved, for example, through a conventional online, real-time auction, in which various advertisers bid for the opportunity to have their ads displayed in the web page. When a user requests to load the web page using the client browser, the web server sends an advertisement request to the advertisement server. In turn, the advertisement server conducts an auction to determine which, among several, advertisers (only one of which is depicted in FIG. 1), are to be awarded the opportunity to serve an ad to the user.

To begin the auction, the advertisement server sends a bid request to the advertiser. The bid request serves to inform the advertiser of the opportunity to bid in the auction, and may include identifying information regarding the web page and the user. To participate in the auction, the RTB processor uses the identifying information in the bid request to generate a bid. Any number of conventional or custom techniques can be used to generate the bid. For instance, when the RTB server receives a request to bid on an ad, it may look up the appropriate bid in a real-time bid database based, for example, on a cookie of the web server, the web site on which the ad will be shown, and a number of other predictive features given during the request to participate in the auction. In some embodiments, the bid is based at least in part upon one or more forecast values obtained from the predictive model, such as forecast cost per impression, forecast revenue per impression or other relevant data. Once the bid is determined, a response to the bid request is sent back to the advertisement server. The bid response takes the form of a URL encoded with several arguments, including the bid amount and the forecast value upon which the bid is premised, in accordance with some embodiments. Other information encoded in the URL may include the address for the ad, which can be used to display the ad to the user in the event that the advertiser wins the auction. In this manner and in some embodiments, if and when the URL is executed by the client browser, the arguments, including the forecast value(s), are sent to the advertiser via a HTTP message. In some embodiments, the URL may be encoded with more than one forecast value. While a URL is used in some embodiments, any suitable locationing mechanism can be used, as will be appreciated in light of this disclosure.

Figure 2:
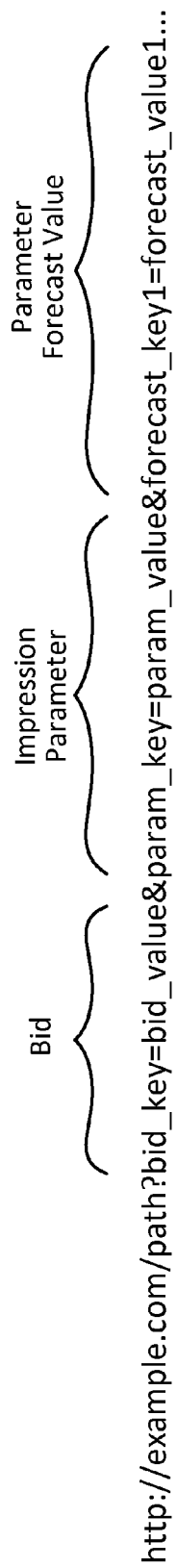
FIG. 2 illustrates an example uniform resource locator (URL) in accordance with an embodiment of the present invention.

FIG. 2 depicts an example URL in accordance with an embodiment. The URL includes, among other information, bid information, impression parameter information (e.g., information describing the parameter, such as cost, revenue, etc.), and one or more forecast values associated with the parameter, such as described above. It will be understood that the format of the URL shown in FIG. 2 is merely one example, and that other formats may be used. If and when the advertiser wins the auction, the advertisement server sends the URL associated with the winning ad impression to the web server so that the advertisement can be displayed along with the web page. In some embodiments, the advertisement server can send the URL back to the advertiser, along with one or more actual values associated with the winning bid (e.g., the actual cost of the ad impression). In either case, the log processor receives the URL from the advertisement server and/or from the client browser and processes the impressions that are won in the auction. The log processor then performs a real-time update of the predictive model based on any forecast inaccuracy that was observed for the won impression using a stochastic descent update optimization technique. In some embodiments, a new predictive model may be created based on the observed data (including, for example, the actual and forecast values associated with the desired parameter) using the stochastic descent update optimization technique.

Referring again to FIG. 1, when an ad impression is won in the auction, certain metadata associated with the ad (e.g., including the bid, actual cost per impression and forecast cost per impression) is logged and placed in the log storage database. The metadata includes the predicted cost, revenue, and/or other information, as this information is included in the URL of the won impression, as described above. In addition, the actual cost per impression and/or other information may be included in the metadata (e.g., actual cost per impression may be provided by the auction processor). The log storage database may be in a file system or a relational database. In one embodiment, the log storage database is a relational database, and each row of the database contains information associated with a single impression. When the metadata associated with a won ad impression is logged in the log storage database, the predictive model can be updated based on at least some of the metadata using stochastic gradient descent. Since, for example, at least some of the metadata associated with the winning ad may be stored in one row of the log storage database, it is possible to make a single pass through unprocessed rows of the database to perform the update.

Overview of Stochastic Gradient Descent Optimization

The following is an overview of one example of a stochastic gradient descent optimization technique that may be used in conjunction with various embodiments. As will be understood by one of skill in the art, stochastic gradient descent is a type of gradient descent optimization method for minimizing an objective function. The objective function may include the sum of several differentiable functions. For example, according to one embodiment, the objective function is:

$$f(\vec{w}) = \|X\vec{w} - \vec{y}\|^2 = \sum_n (\vec{x_n} \cdot \vec{w} - \vec{y_n})^2$$

where $\vec{w}$ is the parameter to be estimated (e.g., cost, revenue, etc.), $\vec{y_n}$ is the actual value for the $n^{th}$ observation in the set of observed or historical data for the parameter, and $\vec{x_n}$ is the corresponding forecast value. Thus, in this example, the objective function to be minimized closely fits the difference, or error, between the forecast value(s) and the actual value(s) in the data set. The parameter is represented here as a vector having multiple dimensions (e.g., product, advertising channel, promotion, time period and/or geographic location); however, in some embodiments, each predictive dimension can be analyzed independently of other predictive dimensions, and the gradient descent can subsequently be recovered using a vector computed out of each predictive dimension, or an aggregated data set including predictive dimensions for different observations.

The gradient calculation for the objective function is:

$$\frac{\partial f}{\partial \vec{w}} = 2 \sum_n \vec{x_n}(\vec{x_n} \cdot w - y_n)$$

From the above, the stochastic gradient descent update for $\vec{w}$ is:

$$\vec{w}_{new} = \vec{w} - \alpha \vec{x'_n}(\vec{x_n} \cdot w - y_n)$$

where $\alpha$ represents the update rate, and where the update is performed as each new observation arrives. It is noted in this example that the updates can be performed for each observation; however, in some embodiments, updates can be performed with respect to blocks of observations, where each block represents some period of time (e.g., hour, day, etc.). Global convergence guarantees for stochastic gradient descent, where the predictive model is linear, depend on setting $\alpha$ (e.g., as a constant value (e.g., "1") or a value changing dynamically with each iterate) and employing a sufficient number of iterations. $\alpha$ may be interpreted as, for example, a time series decay, a gradient step length, or an annealing factor. With the block approach, updates to the predictive model can be based on data chunked by time. By combining the block update approach with the aggregated data approach described above, updates to the predictive model can be performed with predictive features independently aggregated (i.e., aggregated data for different predictive dimensions) at the time-based block level.

According to various embodiments, there are at least to ways to implement updates to the predictive model: (1) to have a copy of the predictive model run against individual observations (i.e., each ad impression) during the aggregation process for computing the error terms for each observation, or (2) to encode the forecast value in the ad URL for computing the error term in real-time as each impression is won in the auction. It is appreciated that, in some embodiments, the latter approach (2) avoids the complexity and practical difficulty of running the linear model against data stored in a data warehouse, as in the former approach (1), since the forecast value is immediately returned in the URL when the impression is won and accordingly there is no need to access the data warehouse to update the predictive model.

As will be appreciated in light of this disclosure, the various modules and components, such as the RTB processor and the log processor, can be implemented in software, such as a set of instructions (e.g. C, C++, object-oriented C, JavaScript, BASIC, etc) encoded on any computer readable medium (e.g., hard drive, server, or other suitable memory), that when executed by one or more processors, cause the various methodologies provided herein to be carried out. In other embodiments, the components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number embedded routines for carrying out the functionality described herein. Any suitable combination of hardware, software, and firmware can be used.

Example Digital Marketing Forecasting Methodology

Figure 3:
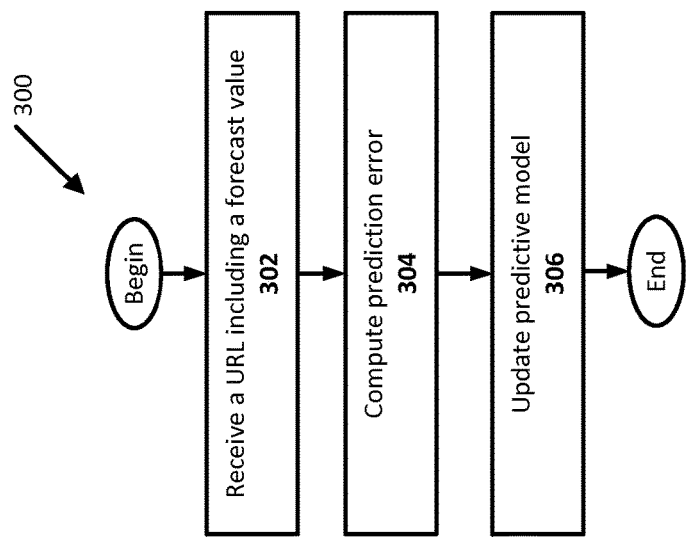
FIG. 3 illustrates an example digital marketing forecasting methodology configured in accordance with an embodiment of the present invention.

FIG. 3 illustrates an example digital marketing forecasting methodology 300 configured in accordance with an embodiment. This method may be implemented, for example, by either or both of the RTB processor and the log processor, or their equivalents, as shown in FIG. 1. It will be appreciated that the order of functionality in the methodologies disclosed herein may vary from one embodiment to another and in sequences not specifically described, but when considered in the aggregate, form or otherwise provide a complete forecasting methodology.

The method 300 begins with receiving 302 receiving, subsequent to winning a bid to buy an ad impression via an online auction, a uniform resource locator (URL) including a forecast value obtained from a predictive model associated with the ad impression. The URL may, for example, be encoded as shown and described with respect to FIG. 2, above. A determination of whether the bid wins the auction may be performed by the auction processor. If the bid does not win, this method 300 may terminate. However, if the bid does win, the advertisement server sends a message (such as the URL) to the advertiser (e.g., the log processor of FIG. 1), and the method 300 continues by computing 304 a prediction error representing a difference between an actual value associated with the ad impression and the forecast value. The actual value may, for example, be obtained from the advertisement server depicted in FIG. 1, or from another source. The forecast value may, in some embodiments, be parsed from the URL by the log processor. The method 300 continues by updating 306 the predictive model based at least in part on the prediction error using a stochastic gradient decent optimization method in real-time or near real-time with respect to the receipt of the URL. In some embodiments, the actual and forecast values each include actual and forecast cost and/or revenue per ad impression, respectively.

Figure 4:
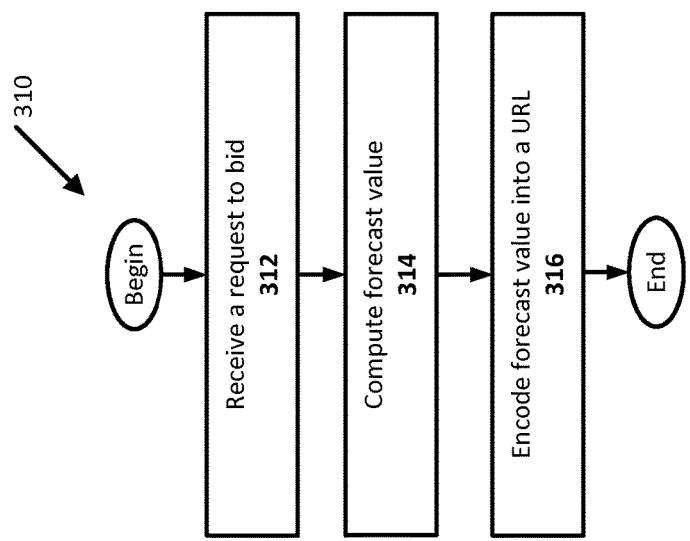
FIG. 4 illustrates another example digital marketing forecasting methodology configured in accordance with an embodiment of the present invention.

FIG. 4 illustrates another example digital marketing forecasting methodology 310 configured in accordance with an embodiment. This method may be implemented, for example, by either or both of the RTB processor and log processor, or their equivalents, as shown in FIG. 1. The method 310 begins by receiving 312 a request to bid on the ad impression via the online auction. The request to bid may be received, for example, from the advertisement server (including the auction processor) described above with respect to FIG. 1. The method 310 continues by computing 314 the forecast value based at least in part on a predictive model, such as the predictive model described with respect to FIG. 1, above. The method 310 continues by encoding 316 the forecast value into the URL, such as shown and described with respect to FIG. 2, above. In some embodiments, the forecast value includes forecast cost and/or revenue per ad impression.

In some embodiments, one or more of the functions of method 300 can be performed prior to, subsequent to, or substantially simultaneous to one or more of the functions of method 310. The order and sequence of the functions of method 300 and method 310 may be dependent, for example, on external events, such as actions taken by the user via the client browser, the web server and/or the advertisement server.

Numerous embodiments will be apparent in light of the present disclosure, and features described herein can be combined in any number of configurations. One example embodiment of the invention provides a computer-implemented method of digital marketing forecasting. The method includes receiving, subsequent to winning a bid to buy an advertising impression via an online auction, a uniform resource locator (URL). The URL includes a forecast value obtained from a predictive model associated with the advertising impression. The method further includes computing a prediction error representing a difference between an actual value associated with the advertising impression and the forecast value, and updating the predictive model based at least in part on the prediction error using a stochastic gradient decent optimization method. In some cases the update is performed in real-time or near real-time with respect to the time at which the URL is received. In some cases, the method includes receiving a request to bid on the advertising impression via the online auction, computing the forecast value based at least in part on the predictive model, and encoding the forecast value into the URL. In some cases, the predictive model includes a plurality of predictive dimensions, and the method includes updating the predictive model for each of the plurality of predictive dimensions independently. In some cases, the actual value includes actual cost and/or revenue per advertising impression, and the forecast value includes predicted cost and/or revenue per advertising impression. In some cases, the method includes computing the forecast value based at least in part on the updated predictive model. Another embodiment provides a non-transient computer-readable medium or computer program product having instructions encoded thereon that when executed by one or more processors cause the processor to perform one or more of the functions defined in the present disclosure, such as the methodologies variously described in this paragraph.

As previously discussed, in some cases, some or all of the functions variously described in this paragraph can be performed in any order and at any time by one or more different processors. For example, another embodiment provides a computer-implemented method of digital marketing forecasting that includes receiving a request to bid on an advertising impression via an online auction, computing a forecast value associated with the advertising impression based at least in part on a predictive model, and encoding the forecast value into a uniform resource locator (URL). In some cases, the method includes: receiving, subsequent to winning a bid to buy the advertising impression via the online auction, the URL including the forecast value associated with the advertising impression; computing a prediction error representing a difference between an actual value associated with the advertising impression and the forecast value; and updating the predictive model based at least in part on the prediction error using a stochastic gradient decent optimization method. In some such cases, the actual value includes actual cost per advertising impression, and wherein the forecast value includes predicted cost per advertising impression. In other such cases, the actual value includes actual revenue per advertising impression, and wherein the forecast value includes predicted revenue per advertising impression. In other such cases, the method includes computing the forecast value based at least in part on the updated predictive model. Another embodiment provides a non-transient computer-readable medium or computer program product having instructions encoded thereon that when executed by one or more processors cause the processor to perform one or more of the functions defined in the present disclosure, such as the methodologies variously described in this paragraph.

Another embodiment of the present invention provides a digital marketing forecasting system. The system includes a storage and a processor operatively coupled to the storage. The processor is configured to receive, subsequent to winning a bid to buy an advertising impression via an online auction, a uniform resource locator (URL). The URL includes a forecast value obtained from a predictive model stored in the storage and associated with the advertising impression. The processor is further configured to compute a prediction error representing a difference between an actual value associated with the advertising impression and the forecast value, and update the predictive model based at least in part on the prediction error using a stochastic gradient decent optimization method. In some cases, the update is performed in real-time or near real-time with respect to the time at which the URL was received by the processor. In some cases, the processor is configured to receive a request to bid on the advertising impression via the online auction, compute the forecast value based at least in part on the predictive model, and encode the forecast value into the URL. In some cases, the predictive model includes a plurality of predictive dimensions, and the processor is configured to update the predictive model for each of the plurality of predictive dimensions independently. In some cases, the actual value includes actual cost and/or revenue per advertising impression, and wherein the forecast value includes predicted cost and/or revenue per advertising impression. In some cases, the processor is configured to compute the forecast value based at least in part on the updated predictive model. In some cases, some or all of the functions variously described in this paragraph can be performed in any order and at any time by one or more different processors, some or all of which are operatively coupled to the storage. For example, in one embodiment, all of the functions variously described in this paragraph may be performed by one processor (e.g., the RTB processor or the log processor of FIG. 1), while in another embodiment, some of the functions variously described in this paragraph may be performed by a first processor (e.g., the RTB processor of FIG. 1) and some other functions may be performed by a second processor (e.g., the log processor of FIG. 2). Another embodiment provides a non-transient computer-readable medium or computer program product having instructions encoded thereon that when executed by one or more processors cause the processor to perform one or more of the functions variously defined in the present disclosure, such as the processor functions variously described in this paragraph.

The foregoing description and drawings of various embodiments are presented by way of example only. These examples are not intended to be exhaustive or to limit the invention to the precise forms disclosed. Numerous variations will be apparent in light of this disclosure. Alterations, modifications, and variations will readily occur to those skilled in the art and are intended to be within the scope of the invention as set forth in the claims.

What is claimed is:

1. A computer-implemented method of digital marketing forecasting comprising:
   receiving, by a bidding processor, a request to bid on a digital advertising impression via an online auction;
   computing, by the bidding processor, a bid to buy the advertising impression based on a predictive model;
   computing, by the bidding processor, a forecast value associated with serving the advertising impression to a user based on the predictive model;
   encoding, by the bidding processor, the bid amount and the forecast value in a uniform resource locator (URL);
   sending, by the bidding processor, the URL to an auction processor;
   receiving, by the bidding processor and subsequent to sending the URL to the auction processor, a message from the auction processor, the message including the URL previously sent to the auction processor, the URL having the bid amount and the forecast value encoded therein;
   parsing, by the bidding processor, the encoded forecast value from the URL included in the message;
   computing, by the bidding processor, a prediction error representing a difference between an actual value associated with the advertising impression and the associated forecast value parsed from the URL; and
   updating, by the bidding processor, the predictive model based at least in part on the prediction error using a stochastic gradient descent optimization method.

2. The method of claim 1, wherein the predictive model includes a plurality of predictive dimensions, and wherein the method further comprises updating the predictive model for each of the plurality of predictive dimensions independently.

3. The method of claim 1, wherein the actual value includes actual cost per advertising impression, and wherein the forecast value includes predicted cost per advertising impression.

4. The method of claim 1, wherein the actual value includes actual revenue per advertising impression, and wherein the forecast value includes predicted revenue per advertising impression.

5. The method of claim 1, further comprising computing the forecast value based at least in part on the updated predictive model.

6. A digital marketing forecasting system, comprising: a storage; and
   a processor operatively coupled to the storage and configured to:
   receive a request to bid on a digital advertising impression via an online auction;
   compute a bid to buy the advertising impression based on a predictive model:
   compute a forecast value associated with serving the advertising impression to a user based on the predictive model;
   encode the bid amount and the forecast value in a uniform resource locator (URL); send the URL to an auction processor;
   receive, subsequent to sending the URL to the auction processor, a message from the auction processor, the message including the URL previously sent to the auction processor, the URL having the bid amount and the forecast value encoded therein;
   parse the encoded forecast value from the URL included in the message; compute a prediction error representing a difference between an actual value associated with the advertising impression and the associated forecast value parsed from the URL; and
   update the predictive model based at least in part on the prediction error using a stochastic gradient descent optimization method.

7. The system of claim 6, wherein the predictive model includes a plurality of predictive dimensions, and wherein the processor is further configured to update the predictive model for each of the plurality of predictive dimensions independently.

8. The system of claim 6, wherein the actual value includes actual cost per advertising impression, and wherein the forecast value includes predicted cost per advertising impression.

9. The system of claim 6, wherein the actual value includes actual revenue per advertising impression, and wherein the forecast value includes predicted revenue per advertising impression.

10. The system of claim 6, wherein the processor is further configured to compute the forecast value based at least in part on the updated predictive model.

11. A non-transient computer-readable medium having instructions encoded thereon that when executed by a processor cause the processor to:

receive a request to bid on a digital advertising impression via an online auction; compute a bid to buy the advertising impression based on a predictive model;

compute a forecast value associated with serving the advertising impression to a user based on the predictive model;

encode the bid amount and the forecast value in a uniform resource locator (URL); send the URL to an auction processor;

receive, subsequent to sending the URL to the auction processor, a message from the auction processor, the message including the URL previously sent to the auction processor, the URL having the bid amount and the forecast value encoded therein;

parse the encoded forecast value from the URL included in the message;

compute a prediction error representing a difference between an actual value associated with the advertising impression and the associated forecast value parsed from the URL; and update the predictive model based at least in part on the prediction error using a stochastic gradient descent optimization method.

12. The computer-readable medium of claim 11, wherein the predictive model includes a plurality of predictive dimensions, and wherein the computer-readable medium further comprises instructions that when executed by the processor cause the processor to update the predictive model for each of the plurality of predictive dimensions independently.

13. The computer-readable medium of claim 11, wherein the predictive model includes a plurality of predictive dimensions, and wherein the computer-readable medium further comprises instructions that when executed by the processor cause the processor to update the predictive model for each of the plurality of predictive dimensions independently.

14. The computer-readable medium of claim 11, wherein the actual value includes actual cost per advertising impression, and wherein the forecast value includes predicted cost per advertising impression.

15. The computer-readable medium of claim 11, wherein the actual value includes actual revenue per advertising impression, and wherein the forecast value includes predicted revenue per advertising impression.

* * * * *